US006989506B2

(12) United States Patent
Yabu

(10) Patent No.: US 6,989,506 B2
(45) Date of Patent: Jan. 24, 2006

(54) METHOD OF MAKING GOLF CLUB HEAD

(75) Inventor: Masanori Yabu, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 10/657,089

(22) Filed: Sep. 9, 2003

(65) Prior Publication Data

US 2004/0045943 A1 Mar. 11, 2004

(30) Foreign Application Priority Data

Sep. 10, 2002 (JP) ............................ 2002-264460

(51) Int. Cl.
*B23K 26/20* (2006.01)
*A63B 53/04* (2006.01)

(52) U.S. Cl. ................................ 219/121.64; 473/324

(58) Field of Classification Search .......... 219/121.64; 473/324

See application file for complete search history.

(56) References Cited

U.S. PATENT DOCUMENTS 4,960,973 A * 10/1990 Fouche et al. ......... 219/121.64
5,706,566 A * 1/1998 Igarashi ..................... 29/527.5
6,617,537 B1 * 9/2003 Chiu et al. ............. 219/121.14
6,783,466 B2 * 8/2004 Seki et al. .................. 473/345
2001/0029208 A1 10/2001 Takeda
2001/0039217 A1 * 11/2001 Takeda ....................... 473/324

FOREIGN PATENT DOCUMENTS

JP 5-15620 A 1/1993
JP 10-15121 A * 1/1998
JP 2001-293115 A 10/2001

* cited by examiner

*Primary Examiner*—Geoffrey S. Evans
(74) *Attorney, Agent, or Firm*—Birch, Stewart, Kolasch & Birch

(57) ABSTRACT

A golf club head includes two metal parts which are connected each other by welding their opposite surfaces. A method of making the golf club head constitutes: making the two metal parts, wherein at least one of them is provided with a small protrusion along the surface to be welded; and laser welding the opposite surfaces by applying a laser beam to at least the protrusion so that the molten material of the protrusion penetrates into a gap between the opposite surfaces to connect the two metal parts.

21 Claims, 9 Drawing Sheets

METHOD OF MAKING GOLF CLUB HEAD

This nonprovisional application claims priority under 35 U.S.C. § 119(a) on Patent Application No(s). 2002-264460 filed in JAPAN on Sep. 10, 2002, which is(are) herein incorporated by reference.

BACKGROUND OF THE INVENTION

The present invention relates to a method of making a golf club head, more particularly to a method of welding metal parts of a club head.

In the golf club heads made up of two or more metal parts such as metal wood-type head and iron-type head, such metal parts are usually connected with each other by one side welding of butt joint, and in recent years, the use of laser welding instead of the widely employed tungsten inert gas (TIG) welding has been suggested or proposed in the Japanese patent No.2600529 and laid-open Japanese patent application JP-A-2001-293115.

On the other hand, in case of metal wood-type club heads for example, the golfers have a tendency to prefer the recent large-sized heads. Thus, the wall thickness in the welded place of such a large-sized head also has a tendency to decrease. Further, to achieve the desired performance (strength, weight and the like), the use of different metal materials is preferred. Therefore, if such metal parts are, as shown in FIG. 13(*a*), temporally butt jointed and a laser beam is applied to the joint part, a joint dent (g) is very liable to occur as shown in FIG. 13(*b*). As the wall thickness is relatively small, the joint dent (g) greatly decrease the joint strength. Further, as the wall thickness is small, if the laser beam is penetrate through the joint part, there is a possibility that the molten material trickles down towards the backside hollow, causing the shortage of the filling material. Thus, the possibility of occurrence of pinholes is also high.

SUMMARY OF THE INVENTION

It is therefore, an object of the present invention to provide a method of making a golf club head by which the joint dent can be effectively prevented to reduce poor weld and improve the joint strength as well as the appearance around the joint part, and thereby the productivity can be greatly increased.

According to one aspect of the present invention, a method of making a golf club head which head comprises two metal parts connected each other by welding their opposite surfaces comprises making the two metal parts, wherein at least one of the two metal parts is provided with a small protrusion along the surface to be welded, and laser welding the opposite surfaces by applying a laser beam to at least the protrusion so that the molten material of the protrusion penetrates into a gap between the opposite surfaces to connect the two metal parts each other.

DESCRIPTION OF THE PREFERRED EMBODIMENTS

Embodiments of the present invention will now be described in detail in conjunction with the accompanying drawings.

Wood-type Head

Figure 1:
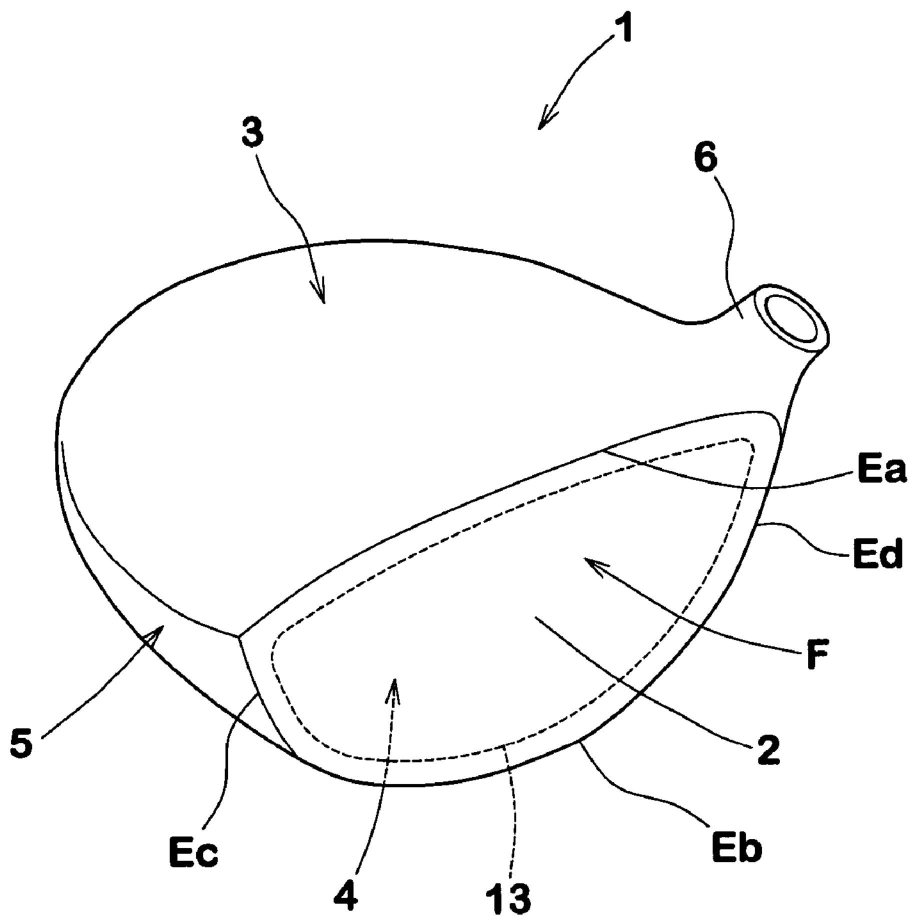
FIG. 1 is a perspective view of a wood-type golf club head according to the present invention.

FIG. 1 shows a metal wood-type hollow golf club head 1 according to the present invention, which comprises a face portion 2 having a front face defining a club face F for hitting a ball, a crown portion 3 intersecting the club face F at the upper edge Ea thereof, a sole portion 4 intersecting the club face F at the lower edge Eb thereof, a side portion 5 between the crow portion 3 and sole portion 4 extending from the toe side edge Ec to the heel side edge Ed of the club face F, and a neck portion 6 with a cylindrical bore for receiving a golf club shaft (not shown).

The wood-type club head 1 is formed by laser welding two or more metal parts P (P1, P2 - - - ) together.

As to the materials of the metal parts P, various metallic material may be employed such as titanium alloys, pure titanium, stainless steel, aluminum alloys, SC steel, maraging steel, magnesium alloys, copper alloys and titanium-zirconium alloys since the laser welding method is employed, it does not matter whether the welded metal parts P are the same or different in the material or alloy's major component.

Two-piece Structure 1

Figure 2:
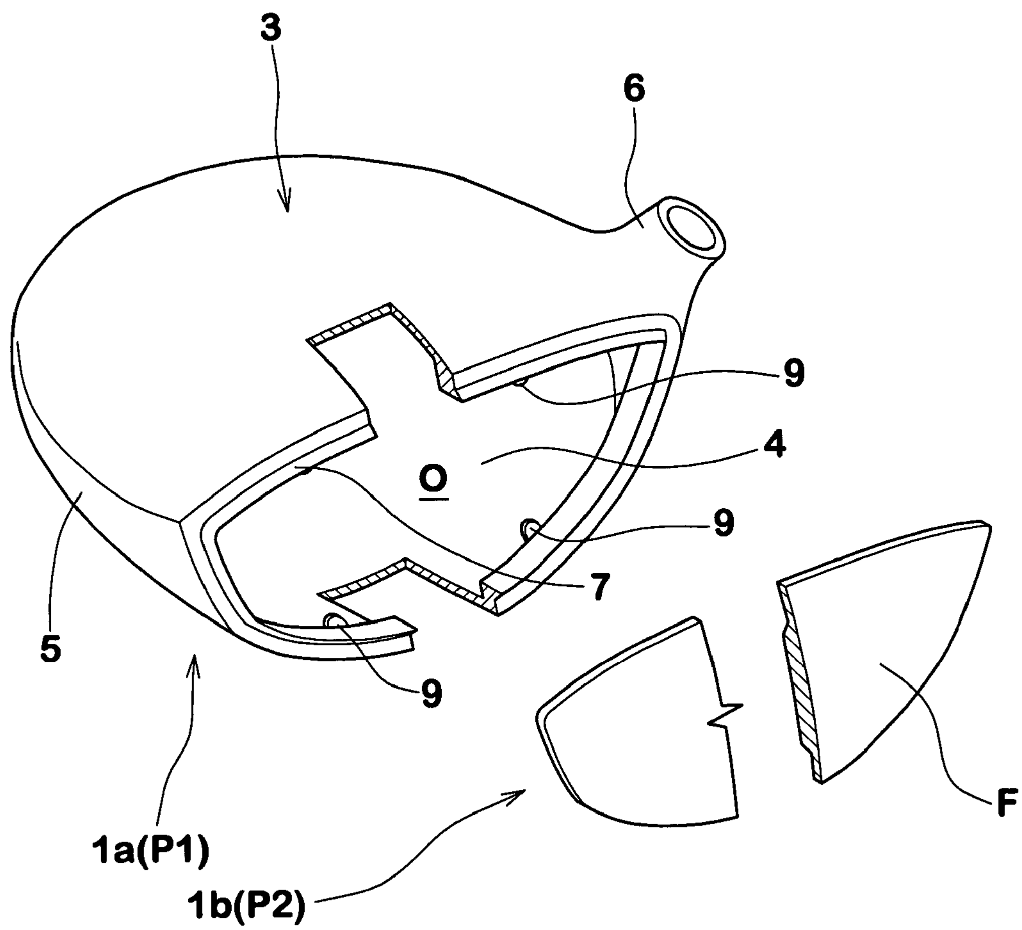
FIG. 2 is an exploded perspective view showing a two-piece structure for the wood-type golf club head.

FIG. 2 shows an example of two piece structure for the head 1, which comprises a first metal part P1 for forming an open-front head main 1*a* including the crown portion 3, sole portion 4, side portion 5 and neck portion 6, and a second metal part P2 which is a face plate 1*b* for forming the almost entirety of the face portion 2. The face plate 1*b* is attached to the front of the head main 1*a* so as to close a front opening O thereof.

The head main 1*a* is, as shown in FIG. 2, provided along the internal circumference of the opening o with one continuous protrusion or a plurality of discontinuous protrusions 9 for the purpose of supporting as well as positioning the backside of the face plate 1*b*.

Figure 3:
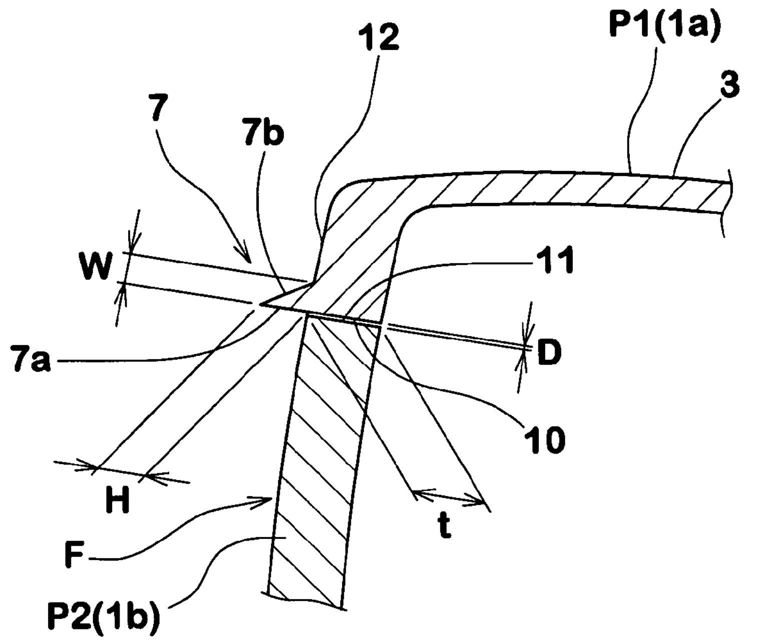
FIGS. 3, 4, 5 and 6 are cross sectional views each showing a structure of a welding part of the club head according to the present invention.

The face plate 1*b* is shaped to accommodate the opening O to fit in snug or loose therewith when the face plate 1*b* is put in the opening o, and as shown in FIG. 3, the gap D between the opposite surface 10 and 11 of the two metal parts P to be welded is preferably set in a range of from 0.1 to 0.5 mm, more preferably from 0.1 to 0.3 mm.

According to the present invention, along one of or each of the opposite surface 10 and 11 to be welded, a small protrusion 7 which functions as a filler rod is continuously formed. FIGS. 2, 3, 4 and 5 show examples in which a protrusion 7 is formed along only one of the opposite surface 10 and 11. FIG. 6 shows an example in which a protrusion 7 is formed along each of the opposite surface 10 and 11. In these example, the protrusion 7 protrudes from the outer surface 12 more specifically front surface F of the head 1, while tapering through to the extreme end.

The protrusion 7 has a surface 7*a* as an extension of the surface 10/11 beyond the outer surface 12, and a surface 7*b* inclined towards the surface 7*a* while extending from the outer surface 12 towards the end of the surface 7*a*. In the drawings, the surface 7*a* is depicted as straight and aligned with the surface 10/11 in the cross section perpendicular to the surface 10/11 and also to the longitudinal (circumferential) direction of the surface 10/11. However, as far as the insertion of the face plate 1*b* to the opening O is not hindered, the surface 7*a* may be slightly curved and/or inclined on the other hand, as the inclined surface 7*b* will not hinder the insertion, it may be straight (as depicted in the drawings) or bent or concave or convex. Therefore, various shapes, e.g. a triangle such as right triangle, quadrant, trapezoid and the like may be employed as the cross sectional shape of each protrusion 7. In the example shown in FIGS. 2 and 3, a protrusion 7 having a substantially triangular cross sectional shape is formed annularly along the circumferential surface 10 of the opening o and integrally with the head main 1*a* by casting.

Figure 4:
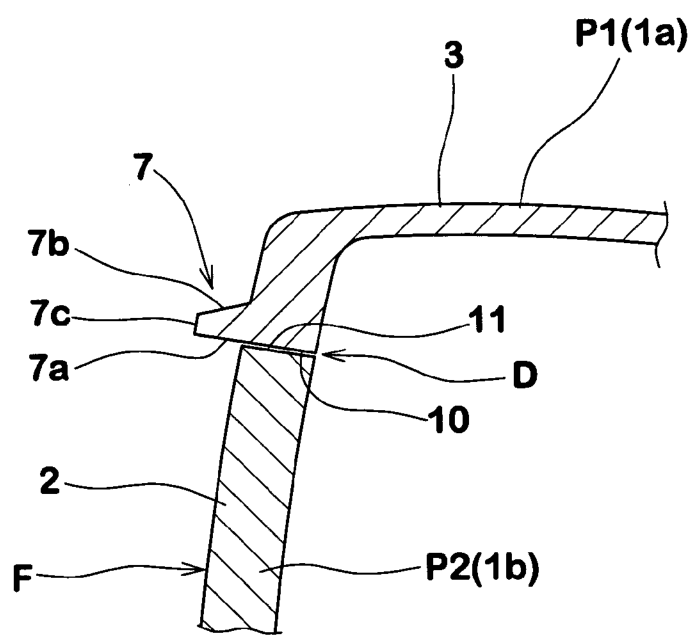

In the example shown in FIG. 4, a protrusion 7 which is provided with a trapezoidal cross sectional shape having a straight side (the surface 7*a*), an inclined side (the surface 7*b*) and an additional side 7*c* (surface perpendicular to 7*a*) is formed in the same way as in the former example.

Figure 5:
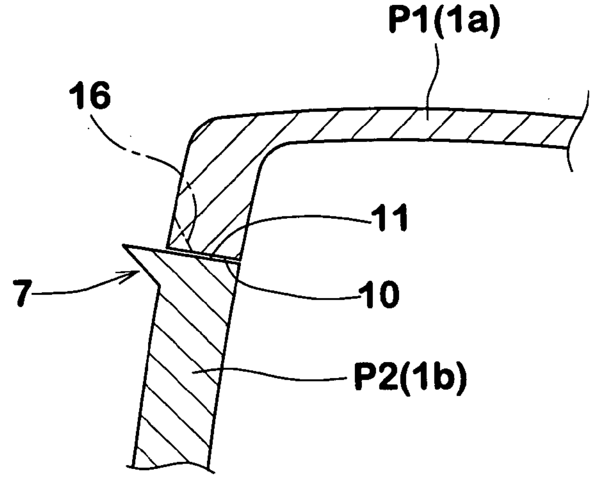
Figure 6:
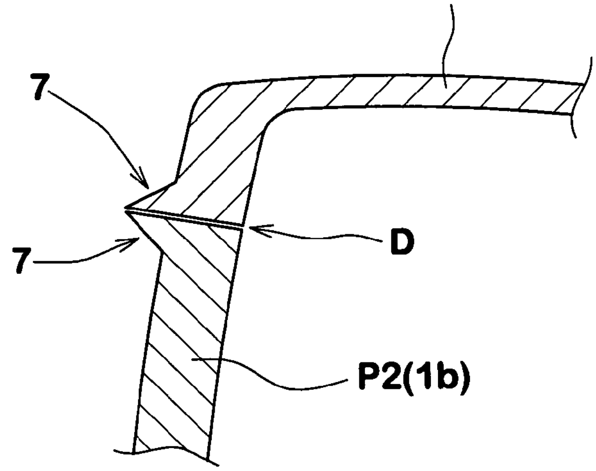

In contrast to the former to examples, in the example shown in FIG. 5, a triangular protrusion 7 is formed on the second metal part P2, namely the face plate 1*b*, annularly along the circumferential surface 11 of the face plate 1*b*.

The example shown in FIG. 6 is a combination of the head main 1*a* (metal part P1) shown in FIG. 3 and the face plate 1*b* (metal part P2) shown in FIG. 5.

In the particular cases shown in FIGS. 3, 4 and 6, in order to facilitate the insertion of the face plate 1*b* to the opening, the surface 7*a* as an extension of the surface 10 of the opening may be inclined toward the outside so that such surface functions as a guide slope.

Two-piece Structure 2

Figure 7:
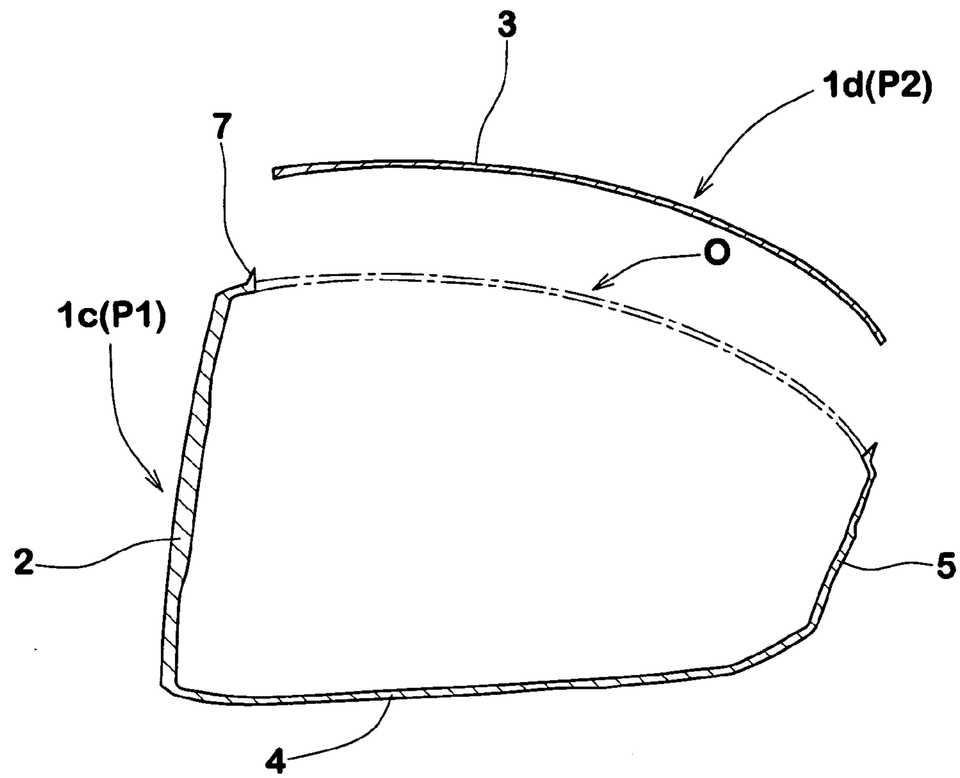
FIG. 7 is an exploded sectional view of another example of the two-piece structure for the wood-type golf club head.

FIG. 7 shows another example of the two-piece structure for the wood-type club head 1, which comprises a first metal part P1 for forming an open-top head main 1*c* including the face portion 2, sole portion 4, side portion 5 and neck portion 6, and a second metal part P2 which is a crown plate 1*d* for forming the almost entirety of the crown portion 3. The crown plate 1*d* is attached to the top of the head main 1*c* so as to close a top opening O thereof. Thus, the crown plate 1*d* is shaped to accommodate the opening O to fit in snug or loose therewith when the crown plate 1*d* is put in the opening O. In this example, a protrusion 7 is provided on the head main 1*c* only. The protrusion 7 is formed annularly along the circumferential surface 10 of the opening O and integrally with the head main 1*c* by casting. Further, similar to the former example, one or more protrusions 9 are formed along the opening O. The crown plate 1*d* is on the other hand, formed by press molding to provide a specific curvature. However, it may be also possible to employ another method such as casting.

Figure 8:
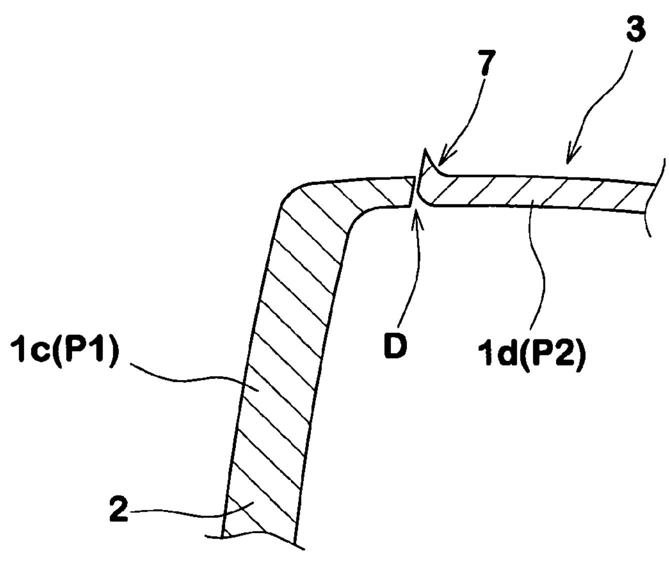
FIG. 8 is an enlarged sectional view showing a modification of the welding part shown in FIG. 7.

FIG. 8 shows a modification of the structure shown in FIG. 8, wherein a protrusion 7 is provided on the crown plate 1*d* instead of the head main 1*c*. In this case, it is preferred that the crown plate 1*d* is formed by press molding to provide its specific curvature and to form the protrusion 7 at the same time. In this type of two-piece structure too, a protrusion 7 may be provided on each of the parts P1 and P2.

Three-piece Structure

Figure 9:
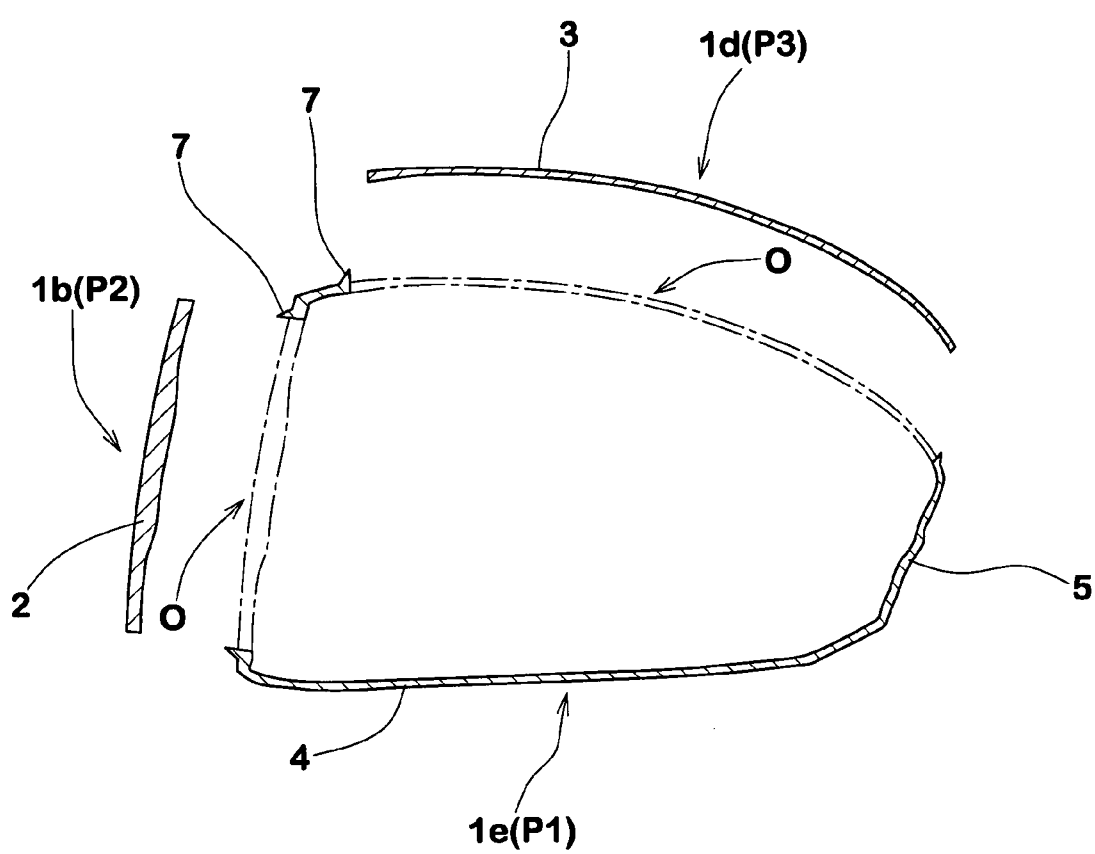
FIG. 9 is an exploded sectional view of showing a three-piece structure for the wood-type golf club head.

FIG. 9 shows a three-piece structure for the wood-type club head 1, which comprises a first metal part P1 for forming an open-top-and-front head main 1*e* including the sole portion 4, side portion 5 and neck portion 6, a second metal part P2 which is the above-mentioned face plate 1*b* for forming the almost entirety of the face portion 2, and a third metal part P3 which is the above-mentioned crown plate 1*d* for forming the almost entirety of the crown portion 3. In this illustrated example, the protrusions 7 are formed along the two openings of the head main 1*e* as explained in the former examples.

Iron-type Club Head

Figure 10:
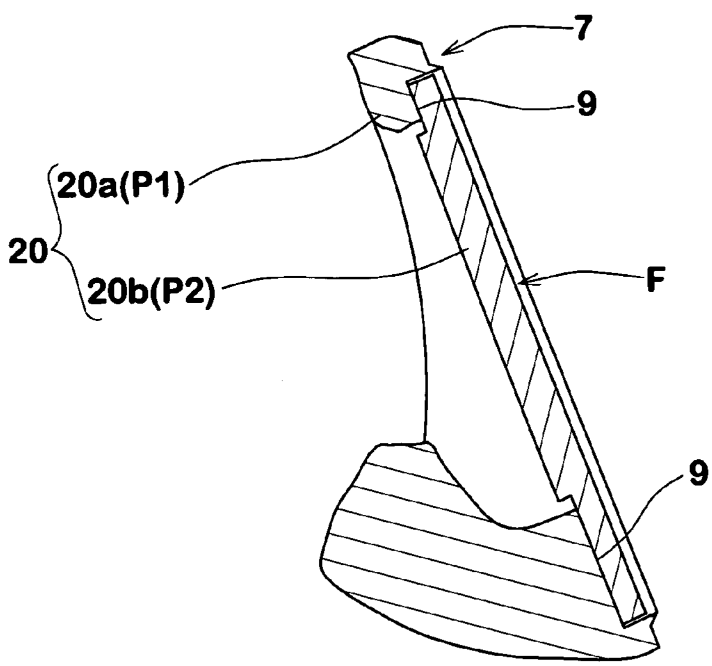
FIGS. 10 and 11 are cross sectional views each showing an iron-type golf club head according to the present invention, taken along a vertical plane passing the center of the club face.
Figure 11:
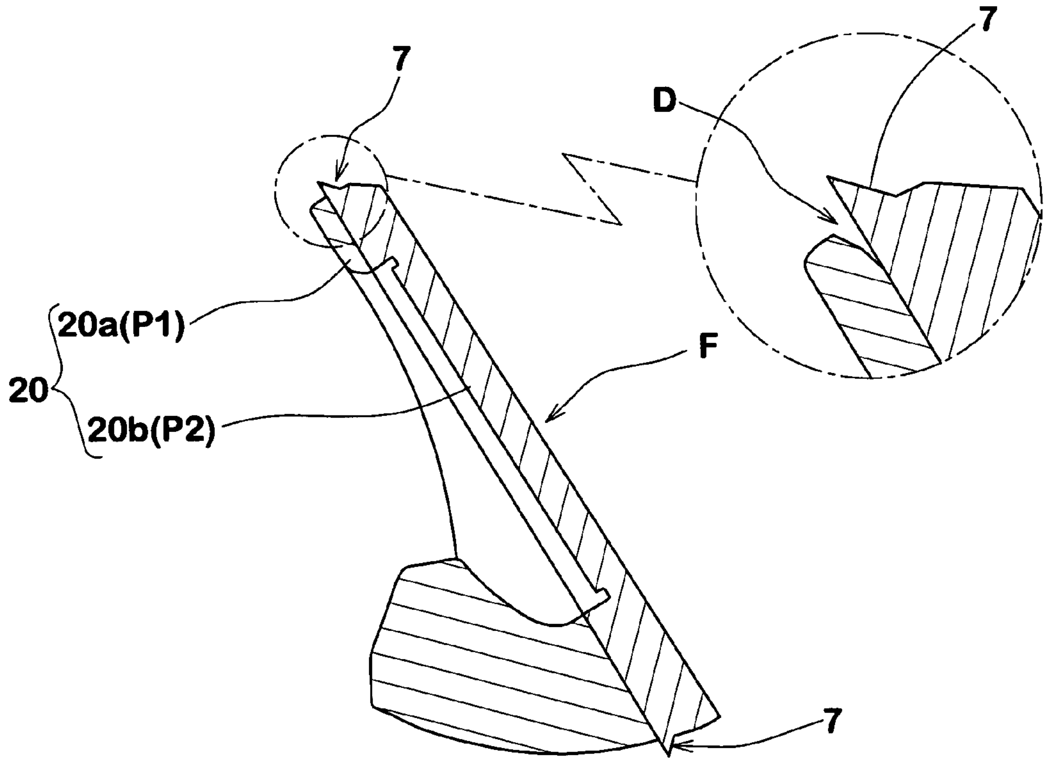

FIGS. 10 and 11 show iron-type club heads 20 according to the present invention, wherein each head 20 comprises a head main 20*a* as one metal part P1 and a face plate 20*b* as one metal part p2.

In the example shown in FIG. 10, the head main 20*a* is provided with an opening or hole penetrating therethrough from the front to the back of the head, and the face plate 20*b* is put in the opening to contact with the above-explained continuous protrusion 9 for the purpose of supporting and positioning the backside of the face plate 20*b*. The protrusion 7 is provided on the head main 20*a* only in the same way as in the example shown in FIGS. 2 and 3.

In the example shown in FIG. 11, the head main 20*a* is provided with an opening or hole penetrating therethrough from the front to the back of the head, and the face plate 20*b* is shaped to accommodate the shape of the front of the head main and disposed directly thereon. The protrusion 7 is provided on the face plate 20*b* annularly along the circumference thereof. In this example, in order to form a gap D, the outer circumferential edge of the font surface of the head main 20*a* is provided with a chamfer 16 formed by a double slope merging into a flat face contacting with the back face of the face plate 20*b*.

In these two examples, due to the through hole, a significant portion of the backside of the face plate 20*b* is exposed.

Making Method

As described above, the metal parts P (P1, P2, P3 - - - ) are formed by appropriate methods, e.g. lost wax precision casting (head main 1*a*, 1*c*, 1*e*, 20*a*), press molding (face plate 1*b*, crown plate 1*d*), forging and the like, depending on the material, position, size, shape and the like of the part. In case of the face plate 1*b*, 20*b*, however, plastic forming such as cold forging and cold press working is preferably used because it is easy to control the crystallographic structure of the metal material in comparison with casting. In the foregoing examples, therefore, the face plate is formed by press molding to give a specific face bulge and roll.

According to the present invention, utilizing the above-mentioned protrusion 7, the opposite surfaces 10 and 11 of the metal parts P (P1, P2, P3 . . . ) are laser welded.

Next, taking the structure shown in FIGS. 2 and 3 as an example, the laser welding according to the present invention will now be explained.

Figure 12A:
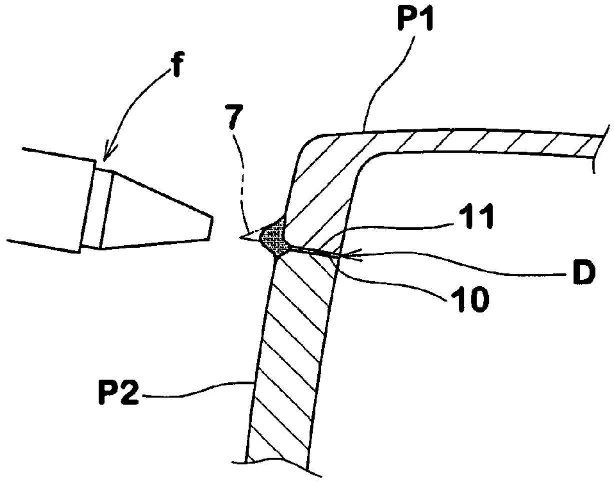
FIGS. 12(*a*), 12(*b*) and 12(*c*) are enlarged sectional views to explain the laser welding according to the present invention.
Figure 12B:
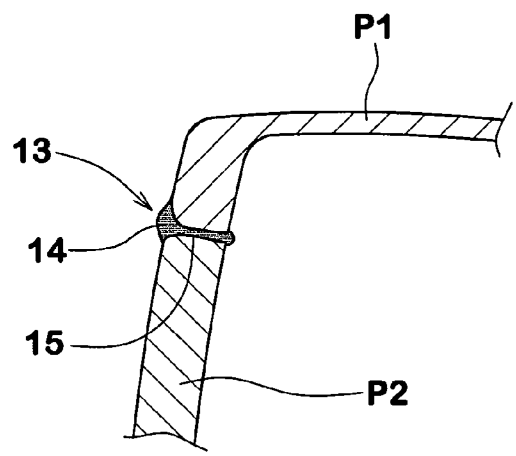
Figure 12C:
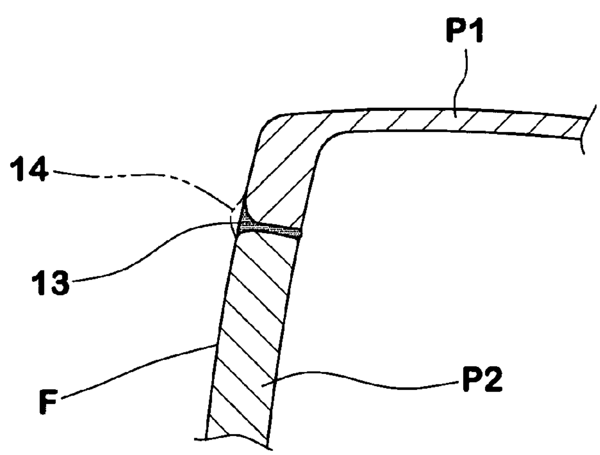
Figure 13A:
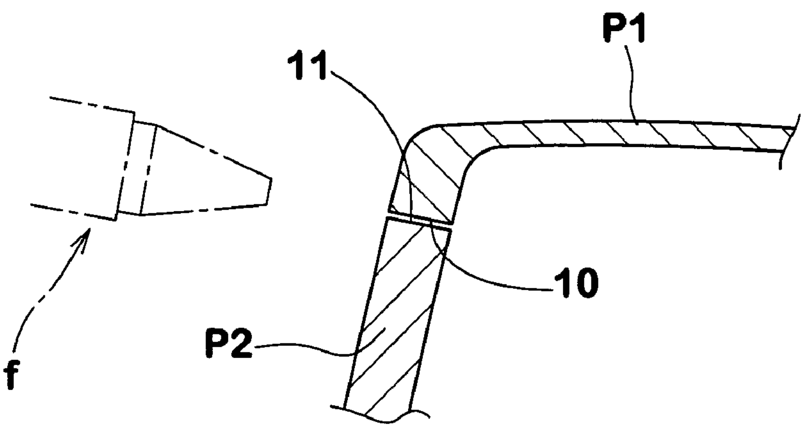
FIGS. 13(*a*) and 13(*b*) are enlarged cross sectional views for explaining the problem arising when one side laser welding of butt joint is applied between thin metal parts.
Figure 13B:
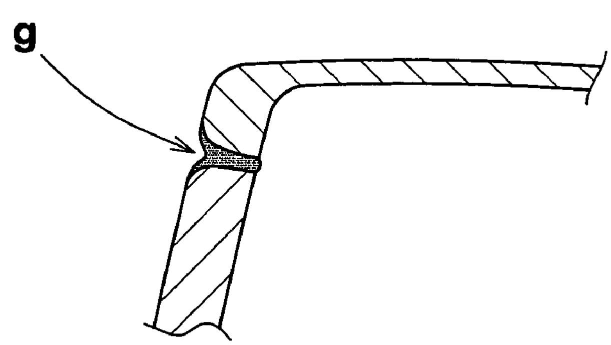

First, the metal parts P1 and P2 are temporarily fixed to each other, utilizing a holder or a self-retention force or another appropriate method. Then, as shown in FIG. 12(*a*), using a laser beam machine (f), high-power laser beam such as $CO_2$ laser or YAG laser is applied to the protrusion 7 and the vicinity of the gap D to melt the metal materials near the surfaces 10 and 11. The molten metal materials 15 flow into the gap D as shown in FIG. 12(*b*) and are fused to connect these two parts P1 and P2. After the welding is completed, as shown in FIG. 12(*c*), the weld bead 14 or swelling part on the head outer surface 12 formed along the welded place 13 by the overflow is removed by grinding or the like and further the surface is polished.

If the volume of the protrusion 7 is too small, a dent along the welded place 13 is formed. If the volume is too large, the applied heat is dispersed and a higher power laser is required, and as a result, the crystallographic of the metal is liable to alter partially. Therefore, to achieve the most effective results in the welding process, as shown in FIG. 3, the height H of the protrusion 7 is preferably set in a range of from 0.3 to 1.0 times, more preferably 0.4 to 0.7 times a thickness (t) of one of the metal parts P1 and P2 which is not larger than the thickness of the other, when measured at the positions of the surfaces 10 and 11, excluding the protrusion 7 by extending the adjacent outer surface 12 of the head along its course. Further, the maximum width W of the protrusion 7 which occurs at the outer surface 12 is preferably set in a range of from 0.5 to 2.0 times, more preferably 0.7 to 1.5 times the height H when measured in parallel with the outer surface 12.

If the gap D is too narrow, it is difficult for the molten metal to penetrate into the gap, which results in a longer laser beam applying time. This is not desirable in view of prevention of the undesirable alternation in the metal structure. Further, as a high degree of precision is required, in view of the production efficiency, production cost and the like, the excessively narrow gap is not desirable. On the other hand, if the gap D is too wide, the molten metal is liable to trickle down and it becomes difficult to bridge the gap. Therefore, the gap D is preferably set in a range of from 0.1 to 0.5 mm, more preferably from 0.1 to 0.3 mm.

Additionally, if the thickness (t) is relatively large, to facilitate the reaching of the laser beam to a deeper point of the gap in the initial stage of the laser applying, and also to facilitate the reaching of the molten metal to the bottom of the gap, a chamfer 16 is preferably provided on the corner on the opposite side of the protrusion 7 as shown in FIG. 5 by chain line for example.

In the foregoing examples, the protrusion 7 extends continuously through its overall length, but the protrusion 7 may be provided with discontinuity as far as the shortage of the molten metal is not caused thereby.

Comparison Test

Metal parts having the specification given in Table 1 were made and laser welded to produce 100 pieces of golf club heads. Then, the welded place was observed visually to check the occurrence of dent. The results are shown in Table 1.

From the test results, it was confirmed that in the golf club heads Ex.1–Ex.5 according to the present invention, the occurrence of dent was effectively reduced, when compared with golf club heads Ref.1–Ref.5.

TABLE 1

| Club head | Ex. 1 | Ex. 2 | Ex. 3 | Ex. 4 | Ex. 5 | Ref. 1 | Ref. 2 | Ref. 3 | Ref. 4 | Ref. 5 |
|---|---|---|---|---|---|---|---|---|---|---|
| Structure | FIG. 2 | FIG. 9 | FIG. 7 | FIG. 10 | FIG. 11 | FIG. 2 | FIG. 9 | FIG. 7 | FIG. 10 | FIG. 11 |
| Head main (casting) | crown + sole + side + neck | sole + side + neck | face + sole + side + neck | | | crown + sole + side + neck | sole + side + neck | face + sole + side + neck | | |
| Material | titanium alloy | titanium alloy | stainless | stainless | stainless | titanium alloy | titanium alloy | stainless | stainless | stainless |
| Face plate | press molding | press molding | — | casting | casting | press molding | press molding | — | casting | casting |
| Material | titanium alloy | titanium alloy | | stainless | stainless | titanium alloy | titanium alloy | | stainless | stainless |
| Crown plate | — | press molding | casting | — | — | — | press molding | casting | — | — |
| Material | | titanium alloy | stainless | | | | titanium alloy | stainless | | |
| Thickness t (mm) | 2 | face 2.0 crown 0.8 | 0.6 | 2 | 2 | 2 | face 2.0 crown 0.8 | 0.6 | 2 | 2 |
| Protrusion | | | | | | | | | | |
| Height H (mm) | 1.2 | face 1.2 crown 0.8 | 0.6 | 1.2 | 1.2 | 0 | 0 | 0 | 0 | 0 |
| Width W (mm) | 1 | 1.0/1.0 | 1 | 1 | 1 | 0 | 0 | 0 | 0 | 0 |
| Rate of occurrence of dent (%) | 0.5 | 0.5 | 0.5 | 0.5 | 0.5 | 65 | 77.2 | 23.4 | 48.9 | 51.6 |

What is claimed is:

1. A method of making a golf club head, said golf club head comprising two metal parts which are connected each other by welding their opposite surfaces, the method comprising making said two metal parts, wherein at least one of said two metal parts is provided with a small protrusion along said surface to be welded, and laser welding said opposite surfaces by applying a laser beam to at least said protrusion so that the molten material of the protrusion penetrates into a gap between the opposite surfaces, wherein the height of the protrusion is in a range of from 0.3 to 1.0 times a thickness (t) of one of the metal parts which is not larger than the thickness of the other.

2. The method of making a golf club head according to claim 1 wherein said two metal parts are made of different materials.

3. The method of making a golf club head according to claim 1 wherein said two metal parts are formed through different methods.

4. The method of making a golf club head according to claim 1 wherein said two metal parts are formed through different methods which are casting and plastic forming.

5. A wood-type golf club head manufactured according to claim 1.

6. An iron-type golf club head manufactured according to claim 1.

7. A method of making a golf club head according to claim 1, wherein said gap between the opposite surfaces to be laser welded is in a range of from 0.1 to 0.5 mm.

8. A method of making a golf club head, said golf club head comprising two metal parts which are connected each other by welding their opposite surfaces, the method comprising making said two metal parts, wherein at least one of said two metal parts is provided with a small protrusion along said surface to be welded, and laser welding said opposite surfaces by applying a laser beam to at least said protrusion so that the molten material of the protrusion penetrates into a gap between the opposite surfaces, wherein the height H of the protrusion is in a range of from 0.3 to 1.0 times a thickness (t) of one of the metal parts which is not larger than the thickness of the other, and the maximum width W of the protrusion is a range of from 0.5 to 2.0 times said height H.

9. A wood-type golf club head manufactured according to claim 8.

10. An iron-type golf club head manufactured according to claim 8.

11. The method of making a golf club head according to claim 8, wherein said gap between the opposite surfaces to be laser welded is in a range of from 0.1 to 0.5 mm.

12. The method of making a golf club head according to claim 8, wherein said two metal parts are made of different materials.

13. The method of making a golf club head according to claim 8, wherein said two metal parts are formed through different methods.

14. The method of making a golf club head according to claim 8, wherein said two metal parts are formed through different methods which are casting and plastic forming.

15. A method of making a golf club head, said golf club head comprising two metal parts which are connected each other by welding their opposite surfaces, the method comprising making said two metal parts, wherein at least one of said two metal parts is provided with a small protrusion along said surface to be welded, and laser welding said opposite surfaces by applying a laser beam to at least said protrusion so that the molten material of the protrusion penetrates into a gap between the opposite surfaces, wherein the protrusion has a surface 7*a* substantially align with one of the opposite surfaces to be laser welded, and a surface 7*b* inclined towards the surface 7*a*, whereby the protrusion is tapered towards its end.

16. An iron-type golf club head manufactured according to claim 15.

17. The method of making a golf club head according to claim 15, wherein said gap between the opposite surfaces to be laser welded is in a range of from 0.1 to 0.5 mm.

18. The method of making a golf club head according to claim 15, wherein said two metal parts are made of different materials.

19. The method of making a golf club head according to claim 15, wherein said two metal parts are formed through different methods.

20. The method of making a golf club head according to claim 15, wherein said two metal parts are formed through different methods which are casting and plastic forming.

21. A wood-type golf club head manufactured according to claim 15.

* * * * *